United States Patent [19]

Chen

[11] Patent Number: 5,690,519

[45] Date of Patent: Nov. 25, 1997

[54] UNDERWATER PROPULSIVE DEVICE

[76] Inventor: Johnson Chen, No. 7 Lane 42, Jen-Shing Road, Tai-Ping Shiang, Taichung Hsien, Taiwan

[21] Appl. No.: 710,436

[22] Filed: Sep. 17, 1996

[51] Int. Cl.$^6$ ............................................. B60L 11/02
[52] U.S. Cl. ................................... 440/6; 417/420
[58] Field of Search .......................... 440/6, 53, 83, 440/75, 111, 112; 464/29; 417/420

[56] References Cited

U.S. PATENT DOCUMENTS 2,556,854  6/1951  Spears et al. .................... 417/420

FOREIGN PATENT DOCUMENTS 2336575  7/1977  France ........................ 417/420
3139816  5/1983  Germany ........................ 440/6

*Primary Examiner*—Edwin L. Swinehart
*Attorney, Agent, or Firm*—Morton J. Rosenberg; David I. Klein

[57] ABSTRACT

A propulsive device includes an enclosed type housing for receiving a motor and a spindle. The housing has no openings for preventing water from entering into the housing. One or more magnets are secured to the spindle and rotated in concert with the spindle. A casing is secured to the housing for rotatably receiving a shaft. The shaft has a blade secured to one end and has one or more magnets secured to the other end for acting with the magnets secured to the spindle and for allowing the blade to be rotated by the motor via the magnets.

1 Claim, 4 Drawing Sheets

UNDERWATER PROPULSIVE DEVICE

BACKGROUND OF THE INVENTION

1. Field of the Invention

The present invention relates to a propulsive device, and more particularly to a underwater propulsive device.

2. Description of the Prior Art

A typical underwater propulsive device is shown in FIG. 4 and comprises a housing 101 having one or more partitions 102 provided therein for rotatably receiving a shaft 11 by bearings 103. The shaft 11 includes one end secured to a motor 10 so as to be driven by the motor 10 and includes one or more fan blades 21 secured to the other end for generating a propulsive force when the fan blades 21 are rotated by the motor 10. A number of sealing rings are also required for preventing water from flowing through the partitions 102. In order to allow the shaft 11 to be smoothly rotated, the sealing rings may not be solidly engaged with the shaft. However, sealing rings thus may not be snugly engaged with the shaft 11 and thus may allow water to flow through the partitions 102.

The present invention has arisen to mitigate and/or obviate the afore-described disadvantages of the conventional underwater propulsive device.

SUMMARY OF THE INVENTION

The primary objective of the present invention is to provide a underwater propulsive device which includes an enclosed type housing having no openings formed therein for preventing water from entering into the housing where the motor is received.

In accordance with one aspect of the invention, there is provided a propulsive device comprising an enclosed type housing, a motor disposed in the housing and including a spindle extended therefrom, the spindle and the motor being received in the housing, the spindle including at least one first magnet secured thereto and rotated in concert with the spindle, a casing secured to the housing, and a shaft rotatably supported in the casing, the shaft including a first end extended outward of the casing and having a blade member secured thereto and rotated in concert with the shaft, the shaft including a second end located closed to the spindle and including at least one second magnet secured to the second end of the shaft and rotated in concert with the shaft. The first magnet acts on the second magnet for driving the shaft to rotate the blade member when the first magnet is rotated by the motor.

In accordance with another aspect of the invention, there is provided a propulsive device comprising two or more chambers formed in the housing for rotatably receiving two or more magnets which are secured to the spindle and which are arranged to be rotated by the motor. One or more gap is formed between the chambers for receiving one or more magnets which are secured to the shaft and which are acted by the magnets secured to the spindle such that the shaft may also be driven to be rotated when the spindle is rotated by the motor.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
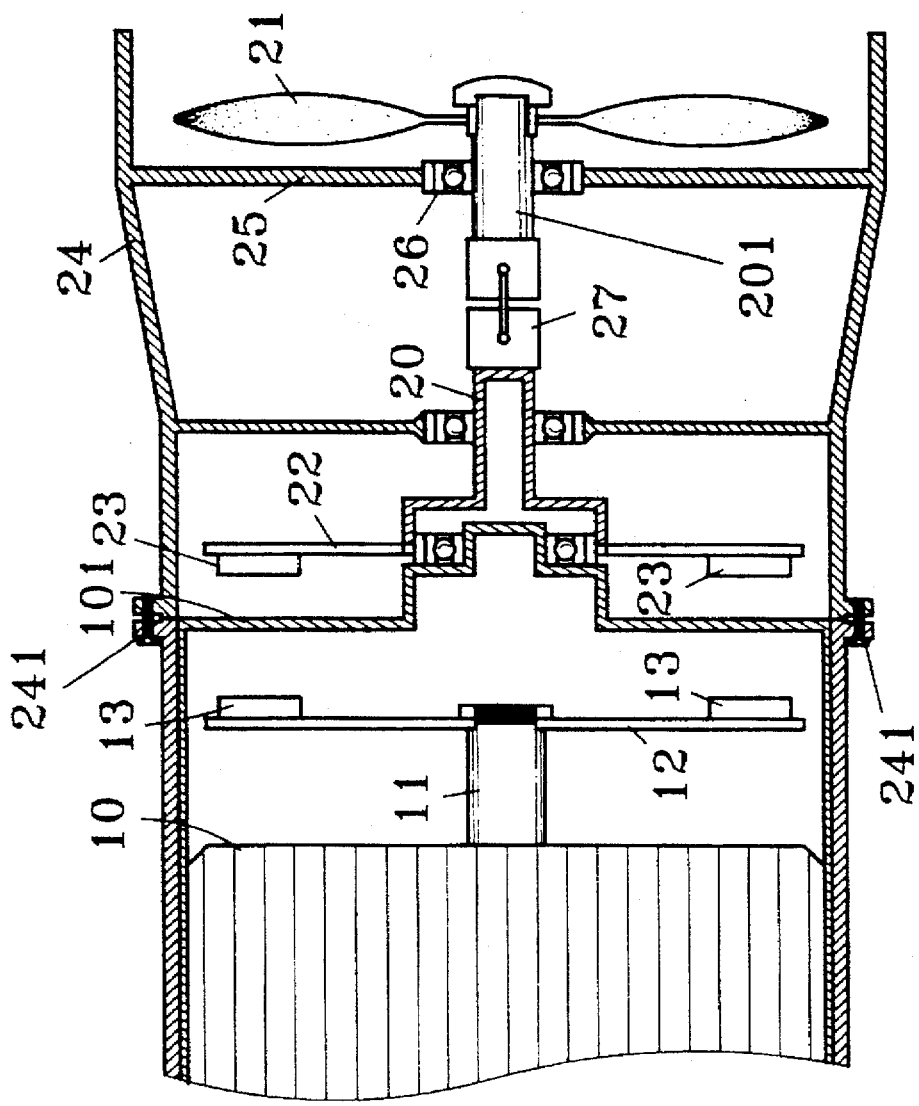
FIG. 1 is a cross sectional view of a underwater propulsive device in accordance with the present invention.

Referring to the drawings, and initially to FIG. 1, a underwater propulsive device in accordance with the present invention comprises a housing 101 including an interior for receiving a motor 10 therein. The motor 10 includes a spindle 11 extended therefrom and received in the housing 101. It is to be noted that the housing 101 includes an enclosed type configuration having no openings formed therein such that water has no chance to flow into the interior of the housing where the motor 10 is disposed. A rotary member 12 is secured to the spindle 11 and rotated in concert with the spindle 11 and includes one or more magnets 13 secured thereto.

A casing 24 is secured to the housing 101 by fastening screws 241 and includes one or more partitions 25 formed therein for rotatably supporting a shaft 20 by bearings 26. The shaft 20 may include two segments 201 coupled together by a universal joint 27. The shaft 20 includes a follower 22 secured to one end and located close to the rotary member 12 and includes one or more magnets 23 secured to the follower 22 and aligned with the magnets 13 for acting with the magnets 13. The shaft 20 includes a blade member 21 secured to the other end thereof for allowing the shaft 20 to be driven by the shaft 20.

In operation, the follower 22 and the magnets 23 may be caused to be rotated by the rotary member 12 and the magnets 13 when the rotary member 12 is rotated by the motor 10 and when the motor 10 is energized. The blade member 21 may thus be rotated by the motor 10 via the action between the magnets 13, 23. The spindle 11 and the shaft 20 are not secured together such that the housing 101 is not required to be formed with any openings therein. Water thus has no chance to flow into the housing 101 where the motor 10 is disposed.

Figure 2:
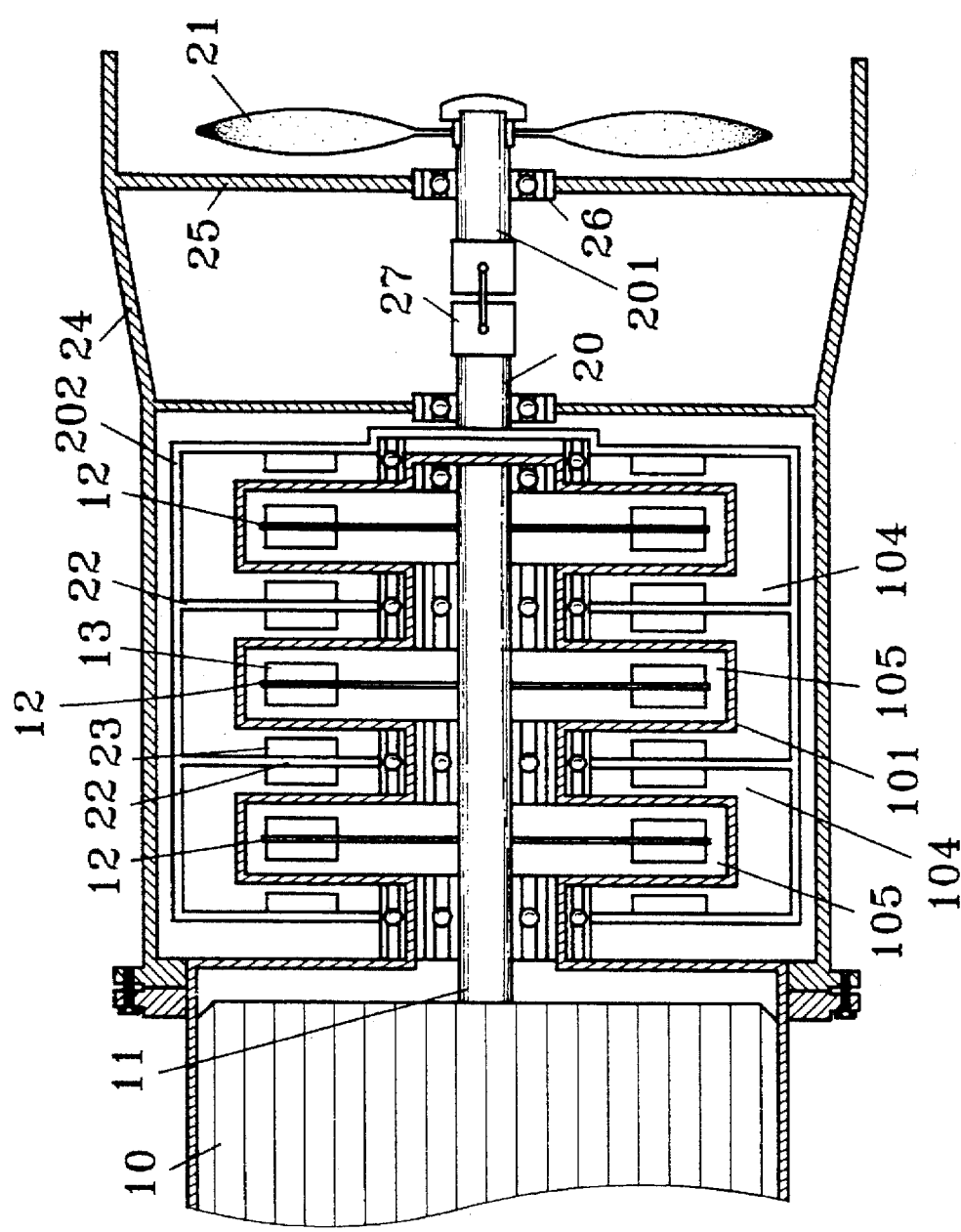
FIG. 2 is a cross sectional view similar to FIG. 1, illustrating another application of the underwater propulsive device.

Referring next to FIG. 2, the housing 101 may include two or more chambers 105 formed therein for rotatably receiving two or more rotary members 12 which are secured to and extended from the spindle 11. The housing 101 also includes two or more gaps 104 formed between the chambers 105. A barrel 202 is secured to the shaft 20 and rotated in concert with the shaft 20 and engaged around the rotary members 12. The barrel 202 includes two or more followers 22 extended radially inward therefrom and engaged in the gaps 104, and includes a number of magnets 23 secured to the followers 22 and aligned with the magnets 13 for allowing the magnets 13 to be acted with the magnets 23 and for allowing the shaft 20 to be driven by the motor 10 when the rotary members 12 are rotated by the motor 10. The housing 101 also includes no openings formed therein such that water has no chance to flow into the housing 101.

Figure 3:
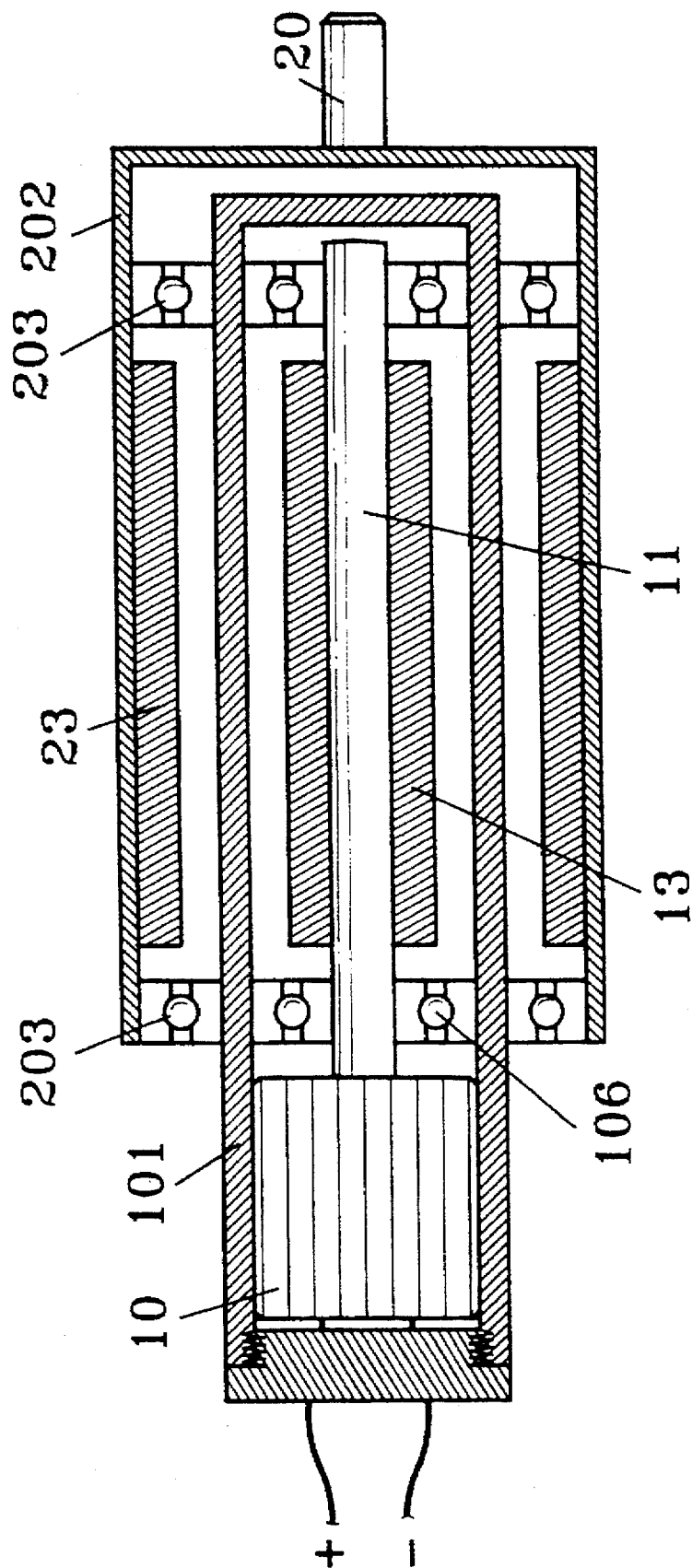
FIG. 3 is a cross sectional view similar to FIGS. 1 and 2, illustrating a further application of the underwater propulsive device.
Figure 4:
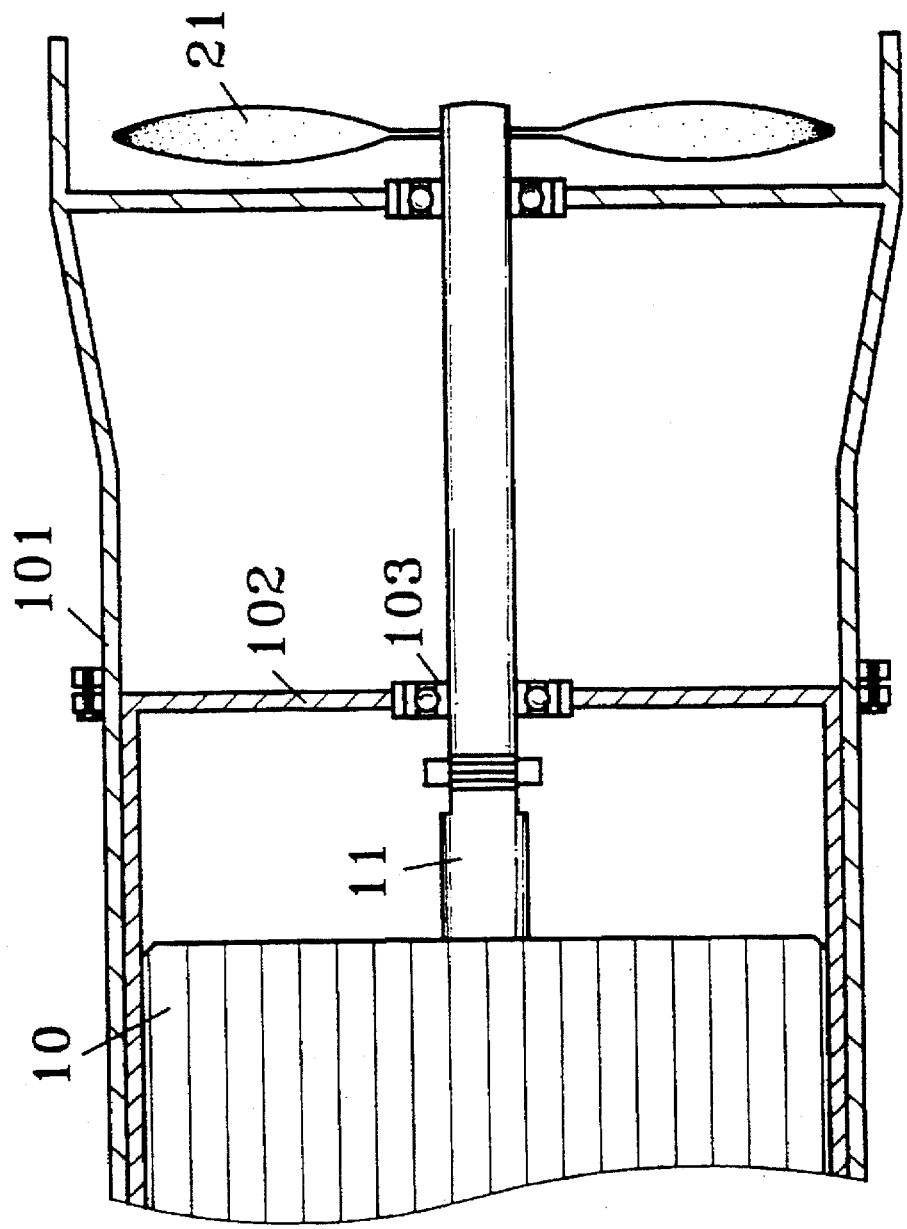
FIG. 4 is a cross sectional view illustrating a typical underwater propulsive device.

Referring next to FIG. 3, the spindle 11 of the motor 10 is also rotatably received in the enclosed housing 101 by bearings 106. The magnets 13 are directly secured to the spindle 11. A barrel 202 is secured to the shaft 20 and engaged around the housing 101 where the spindle 11 is located. The barrel 202 is rotatably engaged around the housing 101 by bearings 203. The magnets 23 are directly secured to the barrel 202 for acting with the magnets 13 and for allowing the shaft 20 to be driven by the motor 10 when the shaft 11 is rotated by the motor 10.

Accordingly, the underwater propulsive device in accordance with the present invention includes an enclosed type housing having no openings formed therein for preventing water from entering into the housing where the motor is received.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A propulsive device comprising;

an enclosed housing, said housing including at least two chambers having at least one gap formed therebetween, a motor disposed in said housing and including a spindle extending therefrom, said spindle and said motor being received in said housing, said spindle including at least two first magnets secured thereto and rotated in concert with said spindle and arranged in said chambers of said housing, a casing secured to said housing, a shaft rotatably supported in said casing, said shaft including a first end extending outwardly from said casing and having a blade member secured thereto and rotated in concert with said shaft, said shaft including a second end located adjacent to said spindle, and a barrel secured to said second end of said shaft and rotated in concert with said shaft, said barrel including at least one second magnet secured to said barrel and rotated in concert with said barrel and engaged in said gap of said housing, said first magnets acting on said second magnet for driving said barrel and said shaft to rotate said blade member when said first magnet is rotated by said motor.

* * * * *